Patented Dec. 10, 1935

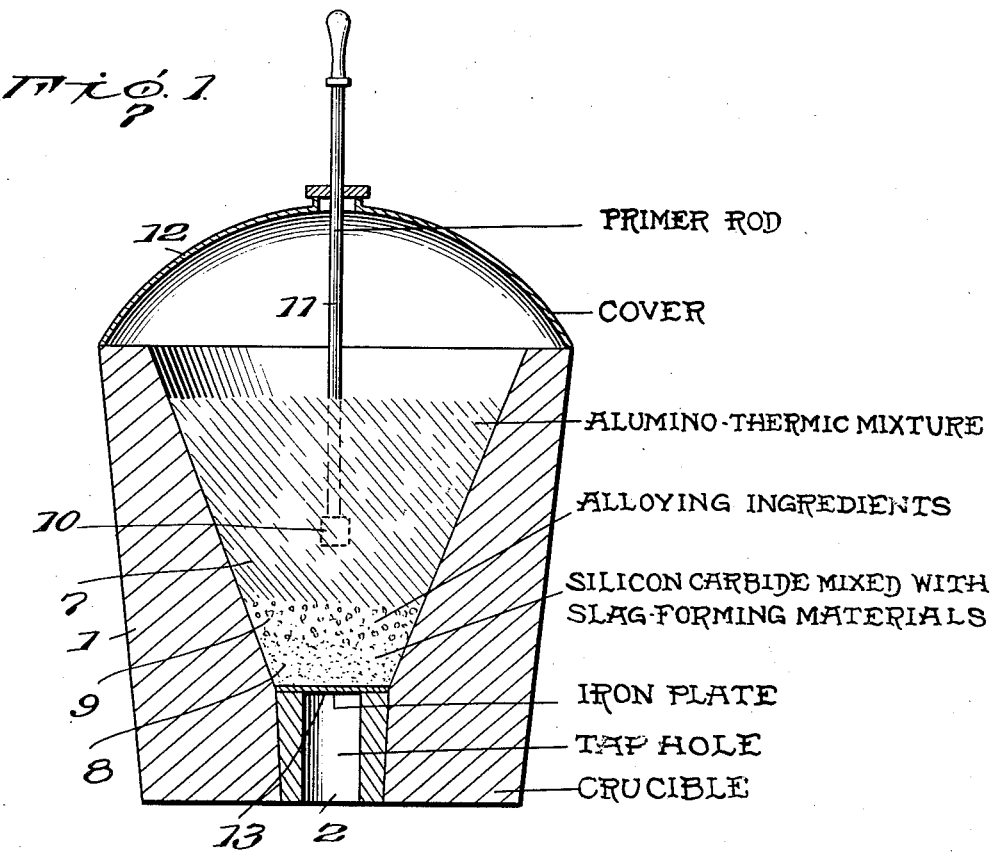
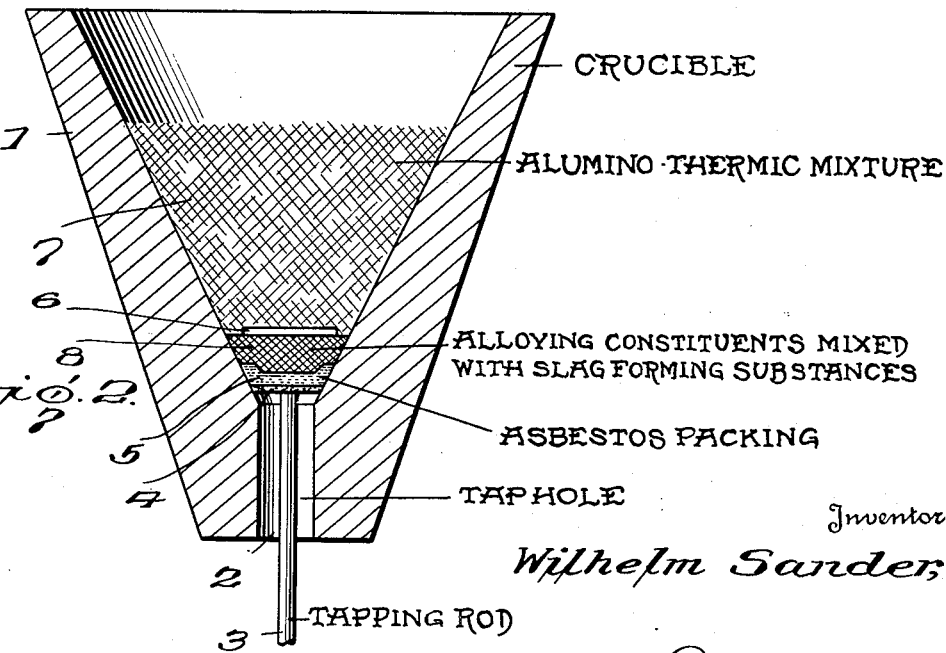

2,024,132

UNITED STATES PATENT OFFICE 2,024,132

PROCESS FOR INTRODUCING STEEL-FORMING ADDITIONS INTO THE ALUMINOGENETIC IRON IN ALUMINOTHERMAL WELDING

Wilhelm Sander, Essen-on-the-Ruhr, Germany, assignor to the firm Th. Goldschmidt A.-G., Essen-on-the-Ruhr, Germany Application June 30, 1934, Serial No. 733,272
In Germany July 6, 1933

6 Claims. (Cl. 75—17)

This invention relates to a process for introducing steel-forming additions or alloying constituents into the aluminogenetic iron in aluminothermal welding.

It is known to introduce steel-forming additions such as manganese, silicon, carbon, silicon carbide and the like, into the aluminogenetic iron in aluminothermal welding, by adding these substances—either as such, or alloyed with one another or with iron—to the aluminothermal mixture prior to the reaction or to the melt after the reaction is completed and before tapping.

This process, however, was attended with the drawback that the steel-forming substances took part, to some extent in the aluminothermal reaction, by reacting with the oxygen of the iron oxide, so that not inconsiderable quantities passed into the slag and were thereby lost as regards the formation of alloys. It has also been proposed to dispose the steel-forming substances, in the form of fine grains on the bottom of the reaction crucible, an arrangement that resulted in a more complete and uniform alloying of said substances with the iron. With this method of introduction the steel-forming substances can serve at the same time for sealing the tap hole of the crucible. Moreover, processes are also known, especially in connection with the employment of silicon carbides, for designing of the crucibles without manual tapping facilities whereby, after the silicon carbide (which serves at the same time for sealing the tap hole) has been dissolved in the aluminogenetically produced iron, the reaction product is intended to run out of the crucible automatically or spontaneously, at the prescribed time. These processes, however, are attended with considerable defects, which are particularly serious, especially when the silicon carbide, which is highly effective for the formation of the steel, is employed.

As is known, commercial silicon carbide consists of about 70% of silicon and about 30% of carbon. Only a comparatively small portion of the carbon enters as an alloying component, into the aluminogenetic iron, whereas a considerable amount under the action of the oxygen of the metallic oxide is burned to carbon monoxide. This causes the reaction to proceed in a very violent manner which, on the one hand may scatter the molten reaction product out of the crucible and, on the other, may cause the reaction product to run prematurely out of the crucible owing to the silicon carbide in the bottom being set in vertical motion.

It has now been found that the desired amounts of steel-forming additions—such as silicon and carbon when silicon carbide is employed—can be introduced into the aluminogenetic iron without the occurrence of the aforesaid drawbacks, if the steel-forming addition (such as silicon carbide) is mixed with a quantity (suitable for the special circumstances of each case) of an inert substance of high melting point and said mixture be used at the same time for sealing the tap hole of the crucible.

Such inert substances comprise, for example, alumina, blast-furnace slag and, in particular, slags formed in the aluminothermal reaction. Owing to their high melting point, these substances, in admixture with the steel-forming additions, form a reliable seal and, moreover, moderate the course of the reaction during the dissolving of the steel-forming additions in the aluminogenetic iron.

This process has rendered it possible, for the first time, to ensure in a perfectly reliable manner, that the reaction product will run out of tapless crucibles at the desired moment. In addition to the inert refractory substances, other alloying constituents such as manganese, nickel, chromium, titanium, vanadium, tungsten and the like may be added to the silicon carbide. Alternatively, the mixture of silicon carbide and inert substances may be employed alone as sealing material whilst the other steel formers may be strewn in larger grain size over said seal.

The choice of the components and their amount depends substantially on the amount of the aluminogenetic mixture to which they are to be added, and also on the desired composition of the aluminogenetic iron. Crucibles with and without tapping devices may be used. If, for example, crucibles with tapping devices be employed, a mixture of about two-thirds silicon carbide and one-third aluminothermal slag, such as is obtained in the aluminothermal production of manganese, has been found suitable.

In the accompanying drawing I have shown how my invention may be used in commercial practice in connection with crucibles which are conventional in the art. In this showing Fig. 1 is a vertical section of a so-called tapless crucible, previously described in German Patent No. 561,364, while, Fig. 2 is a corresponding section of a crucible provided with tapping rod, this crucible being shown previously in German Patent No. 544,447.

In the figures like elements are designated by like reference numerals. Element 1 represents the crucible itself, which is provided with a tap hole 2. The tap rod 3 of the crucible of Fig. 2 is shown at the bottom of the figure, this rod being provided at its top with an iron plate 4 which normally is retained by the constricted bottom of the crucible. Above this iron plate 4 there may be placed a layer of asbestos packing 5 which prevents melting of the iron plate prior to tapping. The alloying ingredients, which are mixed with the slag-forming substances in accordance with the present invention, are shown disposed as a layer 8 above the asbestos packing. An iron plate 6 may be placed on top of the mixture of alloying ingredients and slag-forming materials, and this is surmounted by the usual alumino-thermic mixture 7.

In the operation of the crucible shown in Fig. 2, the alumino-thermic mixture is first ignited. The material above the iron plate 6 soon becomes molten and the heat then melts this plate. This exposes the mixture of alloying ingredients and slag-forming substances to the action of the molten alumino-thermic mixture. The slag-forming materials present in this mixture slow down the reaction between the alloying ingredients and the melt, producing a smooth reaction and preventing sputtering. These materials also serve to protect the iron plate 4 and the asbestos packing 5 to some extent from the high heat developed during the alumino-thermic reaction. The presence of these substances thus insures retention of the melt in the crucible until the latter is positively tapped by raising the tap rod 3.

The tapless crucible shown in Fig. 1 has a quite similar structure. In this crucible the tap hole 2 is closed by a thin iron plate 13. This is covered by a mixture 8 of silicon carbide and slag-forming constituents, this mixture forming a packing or sealing layer above the tap hole. This mixture is covered by a layer 9 of alloying ingredients which in turn is surmounted by the alumino-thermic mixture 7. The crucible is shown furnished with a primer 10 and primer rod 11. It is also provided with a cover 12.

The operation of the crucible shown in Fig. 1 proceeds as follows: The primer 10 is used to ignite the alumino-thermic mixture which rapidly becomes molten, melting and uniting with the alloying ingredients 9. This exposes the mixture 8 of silicon carbide and slag-forming ingredients to the action of the alumino-thermic mixture. The silicon carbide reacts with the oxide of the alumino-thermic mixture to some extent forming carbon monoxide. But the presence of the slag-forming materials slows down this reaction and prevents the usual sputtering. The mixture of silicon carbide and slag-forming substances thus unites with the melt slowly and smoothly and this is not completed until the entire mass of alumino-thermic mixture has had time to become molten and homogenized, that is, until the alumino-thermic reaction has been completed. At this point the iron plate 13 becomes exposed to the melt and this plate dissolves and the crucible is automatically tapped at the proper instant. The time of tapping may be controlled, as described previously, by the addition of the proper amount of slag-forming materials. The greater the amount of slag-forming materials added to layer 8 the longer the delay before the crucible is automatically tapped. This means that the time of tapping may be predetermined, a result which was impossible prior to the present invention.

Various changes may be made in the details of construction of the crucibles and the manner of applying the mixture of alloying ingredients and slag-forming materials as a packing without departing from the purview of the present invention. Various changes which fall within the scope of the following claims will be at once evident to those skilled in the art.

What I claim is:

1. In the alumino-thermic process wherein various alloying constituents are added to the alumino-thermic mixture in a crucible, the improvement which comprises mixing such alloying constituents with inert, refractory, slag-forming substances, applying said mixture as a packing layer about the tap hole of said crucible to prevent flow of the alumino-thermic melt prior to completion of the alumino-thermic reaction and adding the usual alumino-thermic mixture to said crucible above said packing layer.

2. In the alumino-thermic process wherein alloying constituents are employed as a packing to cover the tap hole of the reaction crucible, the improvement which comprises mixing such alloying constituents in finely granular form with inert, finely divided substances of high melting point and applying this mixture as a packing layer over said tap hole, thereby sealing said tap hole and preventing flow of the alumino-thermic melt prior to completion of the alumino-thermic reaction.

3. The process of claim 2 wherein the inert, high-melting substances are alumino-thermic slags.

4. The process of claim 2 wherein a mixture of silicon carbide and inert, high melting substances is applied as said packing layer.

5. In the alumino-thermic process wherein alloying constituents are employed as a packing to cover the tap hole of the reaction crucible, the improvement which comprises mixing such alloying constituents in finely granular form with finely divided inert, refractory substances of high melting point, applying this mixture as a sealing layer over said tap hole and placing a layer of alloying constituents above said sealing layer thereby sealing said tap hole and preventing flow of the alumino-thermic melt prior to completion of the alumino-thermic reaction.

6. In the alumino-thermic process wherein alloying constituents are employed as a packing to cover the tape hole of the reaction crucible, the improvement which comprises applying as a sealing layer above the tap hole of a reaction crucible a mixture of silicon carbide and high melting inert refractory material of such depth and in such proportions as to seal said tap hole until the alumino-thermic reaction has been completed and then to react with the resulting alumino-thermic melt, thereby breaking said seal and automatically tapping said crucible.

WILHELM SANDER.